(12) United States Patent
Maruta et al.

(10) Patent No.: US 6,816,623 B1
(45) Date of Patent: Nov. 9, 2004

(54) IMAGE READING APPARATUS PROVIDING SHADING COMPENSATION RELATED TO THE ON-TIME OF THE LIGHT SOURCE

(75) Inventors: Hidekazu Maruta, Yokohama (JP); Kensaku Kusaka, Moriya-machi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/329,201

(22) Filed: Jun. 10, 1999

(30) Foreign Application Priority Data

Jun. 11, 1998 (JP) ............................................ 10-163638

(51) Int. Cl.[7] .............................. G06K 9/40; H04N 1/04
(52) U.S. Cl. ...................... 382/274; 358/461; 358/474; 358/475
(58) Field of Search ................................. 358/474, 461, 358/483, 475, 400, 509, 491, 494, 505; 382/274

(56) References Cited

U.S. PATENT DOCUMENTS

| | | | |
|---|---|---|---|
| 4,677,287 A | | 6/1987 | Ejima .......................... 250/205 |
| 4,875,104 A | * | 10/1989 | Kamon ........................ 358/400 |
| 5,032,712 A | | 7/1991 | Ito .............................. 250/208 |
| 5,099,341 A | * | 3/1992 | Nosaki et al. .............. 358/461 |
| 5,151,796 A | | 9/1992 | Ito et al. ..................... 358/461 |
| 5,151,797 A | * | 9/1992 | Nosaki et al. .............. 358/448 |
| 5,331,433 A | | 7/1994 | Sato ............................ 358/471 |
| 5,844,695 A | * | 12/1998 | Suzuki ....................... 358/475 |
| 5,864,408 A | * | 1/1999 | Kumashiro ................. 358/461 |
| 6,034,789 A | * | 3/2000 | Kawai ........................ 358/461 |
| 6,229,627 B1 | * | 5/2001 | Taguchi et al. ............. 358/461 |
| 6,330,083 B1 | * | 12/2001 | Nabeshima et al. ........ 358/474 |

FOREIGN PATENT DOCUMENTS

| | | | | |
|---|---|---|---|---|
| EP | 0 587 978 A1 | | 3/1994 | |
| JP | 61-071764 | | 4/1986 | |
| JP | 63-001249 | | 1/1988 | |
| JP | 01-132275 | | 5/1989 | |
| JP | 11122433 | * | 4/1999 | ............ H04N/1/04 |

* cited by examiner

*Primary Examiner*—Kimberly Williams
*Assistant Examiner*—Melanie Vida
(74) *Attorney, Agent, or Firm*—Fitzpatrick, Cella, Harper & Scinto

(57) ABSTRACT

An image reading apparatus including a light source for illuminating an original, a white member which is illuminated by the light emitted from the light source, a photo-electric converting element for receiving the reflection light from the original and the reflection light from the white member, a memory for storing a reference output of the photoelectric converting element which is obtained by receiving the reflection light from the white member, a shading compensation device for compensating an output of the photoelectric converting element which is obtained by receiving the reflection light from the original in accordance with the reference output, and a rewriting device for rewriting the reference output to be stored in the memory, wherein the rewriting device rewrites the reference output at a timing according to a fluctuation in light amount of the light source.

3 Claims, 5 Drawing Sheets

IMAGE READING APPARATUS PROVIDING SHADING COMPENSATION RELATED TO THE ON-TIME OF THE LIGHT SOURCE

BACKGROUND OF THE INVENTION

1. Field of the Invention

The invention relates to an image reading apparatus which is used as an image reading unit of a copying apparatus or a facsimile or which is connected to a terminal of a personal computer or the like and is used.

2. Related Background Art

In an image reading apparatus, a phenomenon such that even if the same original is read, its output (reading density) differ from each other occurs due to a cause such as fluctuation per hour in a light emission amount of a light source, fluctuation in association with an increase in temperature, fluctuation in sensitivity from pixel to pixel of a photoelectric converting unit, or the like.

To prevent a deterioration in image quality in association with the fluctuation of the reading density, hitherto, white reference data is obtained by scanning a white reference plate prior to reading an original image and a shading compensation of the original image is performed on the basis of the white reference data.

As an apparatus for performing the shading compensation, for example, there has been proposed an image input apparatus (refer to JP-A-61-71764) comprising: a circuit for A/D converting an image signal obtained by scanning a white reference plate a plurality of number of times, accumulating A/D converted image signals every pixel, and storing an accumulation result; and a circuit for calculating a shading compensation coefficient from the accumulated value and storing it, wherein the shading compensation coefficient is obtained with low noises and at a high speed. There has also been proposed an image reading apparatus (refer to JP-A-63-1249) for discriminating an operating life of a light source or a white reference plate by comparing the maximum value of an image signal obtained by scanning a white reference plate by a plurality of lines with a preset threshold value, or the like.

There has also been proposed a shading compensating apparatus (refer to JP-A-1-132275) in which a carriage on which an image sensor, a light source, and the like are mounted is moved while reflection light from a white reference plate is being read, thereby suppressing an influence of a change in partial reflectance on the reference plate.

As mentioned above, the conventionally proposed techniques have a purpose to obtain a shading coefficient of small noises, a purpose to discriminate an operating life of the light source or white reference plate based on the white reference data obtained by reading the white reference plate, and a purpose to reduce the influence of the difference of the partial reflectance when the white reference plate is read.

In the conventional shading compensation, explanation will be made by using a facsimile apparatus 1 in FIG. 6. Prior to reading an original 2, generally, white reference data is obtained by irradiating light from a light source 3 to a white reference plate 4, and the shading compensation is performed on the basis of the white reference data.

That is, in the facsimile apparatus 1, prior to reading the original 2, the light is irradiated from the light source 3 to the white reference plate 4, the reflection light is reflected by a mirror 5 and is introduced into an image sensor 7 through a lens 6. The light is photoelectrically converted by the image sensor 7 and transmitted to an A/D converter 9 through an amplifier 8. The maximum value of the image signal of one line which is inputted to the A/D converter 9 is detected and held by a peak hold circuit 10. On the basis of the peak value detected and held by the peak hold circuit 10 as a reference, the A/D converter 9 quantizes the image signal which was amplified by the amplifier 8 and inputted. The quantized signal is stored as white reference data into a line buffer 12 through a shading compensation circuit 11. (A series of those operations is hereinafter referred to as a shading operation).

When the original 2 is read, the light is irradiated from the light source 3 to the original 2 conveyed on a guide 13. The reflection light is reflected by the mirror 5 and is introduced into the image sensor 7 through the lens 6. The image signal photoelectrically converted by the image sensor 7 is transferred to the A/D converter 9 through the amplifier 8. In this instance, the maximum value of the image signal of one line is detected by the peak hold circuit 10. The maximum value (peak value) is used as a reference, the image signal is quantized by the A/D converter 9, and the quantized signal is outputted to the shading compensation circuit 11.

When the white reference plate 4 is read, a system control unit 14 sequentially reads out the white reference data stored in the line buffer 12 every pixel in response to the image signal that is inputted from the A/D converter 9. The read-out white reference data is sent to the shading compensation circuit 11. The image signal inputted from the A/D converter 9 to the shading compensation circuit 11 is subjected to a shading compensation calculation on the basis of the white reference data and a shading compensated signal is outputted to a digital image processing circuit 15. Thus, the digital image processing circuit 15 performs various image processes to the shading compensated image signal.

When the image reading apparatus of the conventional facsimile apparatus 1 or the like obtains the white reference data by once reading the white reference plate 4 before the original 2 is read, the apparatus subsequently executes the reading operation of the original 2 and shading-compensates the read image signal on the basis of the white reference data (hereinafter, the above series of operations is referred to as an image reading operation).

In such a conventional image reading apparatus, however, the white reference plate is certainly scanned once prior to reading one original and the white reference data is obtained. Therefore, when a number of originals exist, a time for the shading operation occurs every time. There is, consequently, a problem such that in case of reading a number of originals, a time for the total image reading operation in which the shading operation, the image reading operation, and the other operations necessary for the image formation or the like are combined becomes long.

To prevent it, a method of reducing the shading operation is also considered. However, for example, when a number of originals are read, if the reflection light from the white reference plate is read out and white reference data is obtained at only the first time, when a change in light amount of a light source by which the first original can be accurately read or the like occurs, a proper light amount compensation is not performed in case of reading the originals of the latter half of a number of originals. There occurs a problem such that when the reduction of the light amount occurs, the read data becomes dense and, contrarily, when the light amount increases, the read data becomes light.

SUMMARY OF THE INVENTION

The invention is made in consideration of the above problems and it is an object of the invention to provide an image reading apparatus which can optimize an image reading speed and a reading image quality.

Another object of the invention is to provide an image reading apparatus comprising:

a light source for illuminating an original;

a white member which is illuminated by a light emitted from the light source;

a photoelectric converting element for receiving reflection light from the original and reflection light from the white member;

memory means for storing a reference output of the photoelectric converting element which is obtained by receiving the reflection light from the white member;

shading compensation means for compensating an output of the photoelectric converting element which is obtained by receiving the reflection light from the original in accordance with the reference output; and rewriting means for rewriting the reference output to be stored in the memory means, wherein the rewriting means rewrites the reference output at a timing according to a light amount fluctuation of the light source.

Still another object of the invention is to provide an image reading apparatus comprising:

a light source for illuminating an original;

a white member which is illuminated by a light emitted from the light source;

a photoelectric converting element for receiving reflection light from the original and reflection light from the white member;

memory means for storing a reference output of the photoelectric converting element which is obtained by receiving the reflection light from the white member;

shading compensation means for compensating an output of the photoelectric converting element which is obtained by receiving the reflection light from the original in accordance with the reference output; and rewriting means for rewriting the reference output to be stored in the memory means, wherein the rewriting means rewrites the reference output at a timing according to a lightening time of the light source.

Still another object of the invention is to provide an image reading apparatus comprising:

a light source for illuminating an original;

a white member which is illuminated by a light emitted from the light source;

a photoelectric converting element for receiving reflection light from the original and reflection light from the white member;

memory means for storing a reference output of the photoelectric converting element which is obtained by receiving the reflection light from the white member;

shading compensation means for compensating an output of the photoelectric converting element which is obtained by receiving the reflection light from the original in accordance with the reference output; and rewriting means for rewriting the reference output to be stored in the memory means, in which in case of continuously reading a plurality of originals, the rewriting means rewrites the reference output every time the number of the read originals amounts to predetermined numbers, wherein a number of originals to be read from a rewriting to a rewriting of the reference output by the rewriting means gradually increases.

Still another object of the invention is to provide an image reading apparatus comprising:

a light source for illuminating an original;

a white member which is illuminated by a light emitted from the light source;

a photoelectric converting element for receiving reflection light from the original and reflection light from the white member;

memory means for storing a reference output of the photoelectric converting element which is obtained by receiving the reflection light from the white member;

shading compensation means for compensating an output of the photoelectric converting element which is obtained by receiving the reflection light from the original in accordance with the reference output; and rewriting means for rewriting the reference output to be stored in the memory means, wherein the apparatus is selectably set in one of a first image reading mode and a second image reading mode in which the number of times of rewriting of the reference output when a plurality of originals are read is smaller than that in the first image reading mode.

The above and other objects and features of the present invention will become apparent from the following detailed description with reference to the accompanying drawings.

DETAILED DESCRIPTION OF THE PREFERRED EMBODIMENT

An embodiment of the invention will now be described hereinbelow with reference to the drawings.

Since an embodiment which will be explained hereinbelow shows a preferred embodiment of the invention, various limitations which are technically preferable are added to the embodiment. However, the scope of the invention is not limited by them unless there is particularly a disclosure of limiting the invention in the following explanation.

Figure 1:
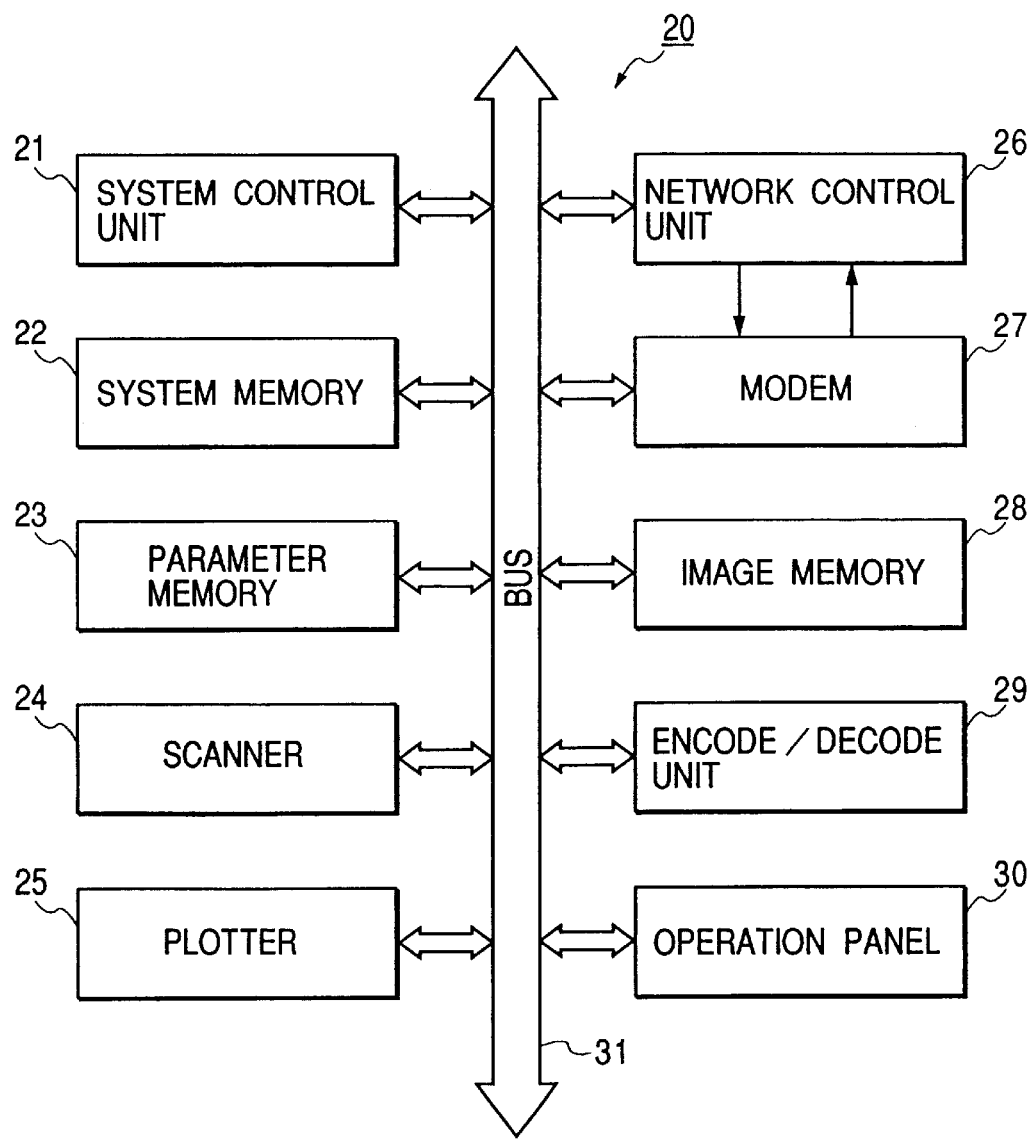
FIG. 1 is a block diagram showing a circuit construction of an image reading apparatus (facsimile apparatus) according to the invention.
Figure 2:
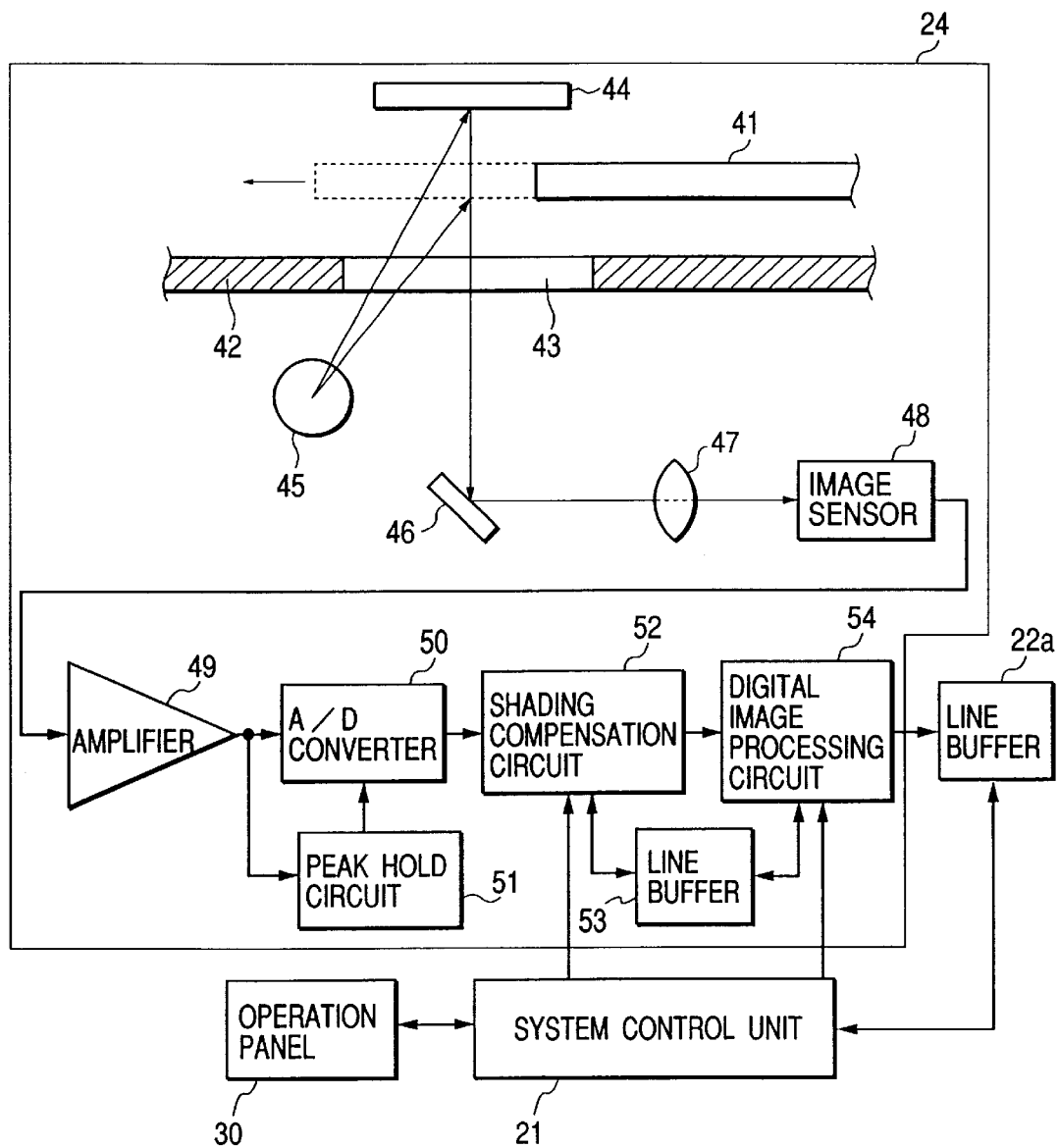
FIG. 2 is a constructional diagram of a main portion of a scanner of the image reading apparatus (facsimile apparatus) according to the invention.

FIG. 1 is a block diagram showing a circuit construction of an image reading apparatus (facsimile apparatus) according to the invention. FIG. 2 is a constructional diagram of a main portion of a scanner shown in FIG. 1.

As shown in FIG. 1, a facsimile apparatus 20 according to the embodiment has: a system control unit 21; a system memory 22; a parameter memory 23; a scanner 24; a plotter 25; a network control unit 26; a modem 27; an image memory 28; an encode/decode unit 29; an operation panel 30; and the like. Those component elements are connected to a bus 31.

The system control unit (control means, discriminating means) 21 has a CPU, an ROM, and the like. A fundamental processing program serving as a facsimile apparatus 20 and the other programs have been stored in the ROM and system data necessary to execute each process has been also stored. In the system control unit 21, the CPU controls each unit of the facsimile apparatus 20 by using the system memory 22 as a work memory on the basis of the program in the ROM and executes a fundamental process as a facsimile apparatus 20.

The parameter memory 23 stores various parameter information necessary for facsimile communication.

As shown in FIG. 2, the scanner 24 comprises: a guide member 42 to guide an original 41 which is conveyed by a conveying roller (not shown); a target glass 43, attached to the guide member 42, for guiding the original 41 and preventing the dust, speck, or the like from entering the optical system; a white reference plate 44 for compensating a shading distortion caused by the optical system; and a light source 45 for irradiating light onto the original 41 which is conveyed or the white reference plate 44. The scanner 24 further comprises: a mirror 46; a lens 47; an image sensor 48; an amplifier 49; an A/D converter 50; a peak hold circuit 51; a shading compensation circuit 52; a line buffer 53; a digital image processing circuit 54; and the like. The shading compensation circuit 52 and the digital image processing circuit 54 are connected to the system control unit 21.

In case of scanning the white reference plate (white reference member) 44, the light emitted from the light source 45 passes through the target glass 43 and is irradiated onto the white reference plate 44. The light reflected by the white reference plate 44 is reflected by the mirror 46, is transmitted through the lens 47, and is formed as an image onto the image sensor 48 at a predetermined reduction ratio. In case of scanning the original 41, the light from the light source 45 passes through the target glass 43 and is irradiated onto the original 41 which is conveyed on the target glass 43. The light reflected by the original 41 is reflected by the mirror 46, is transmitted through the lens 47, and is formed as an image onto the image sensor 48 at a predetermined reduction ratio.

The image sensor 48 converts the imaging light information into an electric signal and outputs it to the amplifier 49. For example, an operational amplifier is used as an amplifier 49. The amplifier 49 amplifies an analog image signal which is inputted from the image sensor 48 at a predetermined magnification and outputs the amplified image signal to the A/D converter 50 and the peak hold circuit 51.

The light source 45, the mirror 46, the lens 47, and the image sensor 48, therefore, function as scanning means as a whole.

The peak hold circuit 51 detects and holds the maximum value (peak value) of the image signal of one line that is inputted from the amplifier 49.

The A/D converter 50 quantizes the image signal inputted from the amplifier 49 by using the peak value held by the peak hold circuit 51 as a reference and outputs the quantized signal to the shading compensation circuit 52.

The line buffer (white reference data memory means) 53 stores the image data of one line that is outputted from the A/D converter 50 when the white reference plate 44 is scanned as white reference data. The white reference data is referred in the shading compensation by the shading compensation circuit 52 or the image process in the digital image processing circuit 54.

The shading compensation circuit (shading compensating means) 52 performs the shading compensating process for compensating the image data of the original which is inputted from the A/D converter 50 on the basis of the white reference data stored in the line buffer 53 under the control of the system control unit 21 and removing the shading distortion caused by the characteristics of the optical system and outputs the compensated data to the digital image processing circuit 54.

The digital image processing circuit (image processing means) 54 operates under the control of the system control unit 21, performs a binarization or half tone process to the image data inputted from the shading compensation circuit 52 with reference to the image data stored in the line buffer 53 or by using the line buffer 53, further executes various image processes, and stores the resultant data into a line buffer 22a.

The line buffer 22a temporarily stores the image data which was binarized or half tone processed by the digital image processing circuit 54. For this purpose, a part of the system memory 22 shown in FIG. 1 is used.

Therefore, when the scanner 24 scans the white reference plate 44 in order to obtain the white reference data for shading compensation, the image signal converted into the electric signal by the image sensor 48 is amplified by the amplifier 49. The amplified signal is converted into the digital signal by the A/D converter 50 by using the peak value held in the peak hold circuit 51 as a reference. After that, the digital value is stored as white reference data into the line buffer 53 through the shading compensation circuit 52.

After that, when the original 41 is scanned, the image signal converted into the electric signal by the image sensor 48 is amplified by the amplifier 49 and is converted into the digital signal by the A/D converter 50. After that, the digital signal is shading compensated by the shading compensation circuit 52 with reference to the white reference data in the line buffer 53, is subjected to various image processes by the digital image processing circuit 54, and thereafter, is transferred to the line buffer 22a.

Although not shown, the scanner 24 usually has an ADF (Auto Document Feeder). The ADF feeds a plurality of set originals 41 one by one to the target glass 43 (namely, a reading unit).

For example, a thermal recording apparatus using a thermal element, an electrophotographic recording apparatus, or the like is used as a plotter 25 shown in FIG. 1. When the thermal recording apparatus is used as the plotter 25, an image is directly recorded onto a thermal recording paper or is indirectly recorded onto a normal recording paper through an ink sheet.

The network control unit 26 is connected to the modem 27. A line (for example, telephone line) is connected to the network control unit 26. The network control unit 26 operates under the control of the system control unit 21 and automatically performs a call-in in response to a call-out from the line, or performs an automatic call-out process to the line, exchanges a facsimile control signal to/from the party's facsimile apparatus, and performs the setting of a communicating function and the exchange of various control information, thereby executing a facsimile communicating procedure.

The modem 27 operates under the control of the system control unit 21 and modulates a transmission signal, or demodulates a reception signal.

The image memory 28 is constructed by, for example, an RAM, a hard disk drive, or the like of a large capacity and mainly stores image data. That is, the image data for transmission read out by the scanner 24 and the received image data are stored in the image memory 28. The stored image data is read out at a predetermined timing under the control of the system control unit 21 and is subjected to a transmitting process, a recording process, or the like.

The encode/decode unit 29 intends to reduce an image data transmitting time and efficiently store the image data into the image memory 28. Upon transmission, the encode/decode unit 29 compresses (encodes) the image data. Upon reception, the encode/decode unit 29 reproduces (decodes) the encoded image data to the original image data.

The operation panel 30 has various operation keys such as ten-key, start key, stop key, function key, and the like and has a display (for example, liquid crystal display). Various commands for a transmitting operation and the like are inputted from the operation keys to the operation panel 30. The contents of the commands inputted from the operation keys and various information to be notified to the operator from the facsimile apparatus 20 are displayed on the display of the operation panel 30.

Various Examples for the facsimile apparatus 20 according to the embodiment will now be described.

EXAMPLE 1

In this Example, in order to obtain the white reference data, the timing to scan the white reference plate 44 or the number of scanning times (the timing for the shading operation or the number of times thereof) is controlled in accordance with a lightening time of the light source 45.

Figure 3:
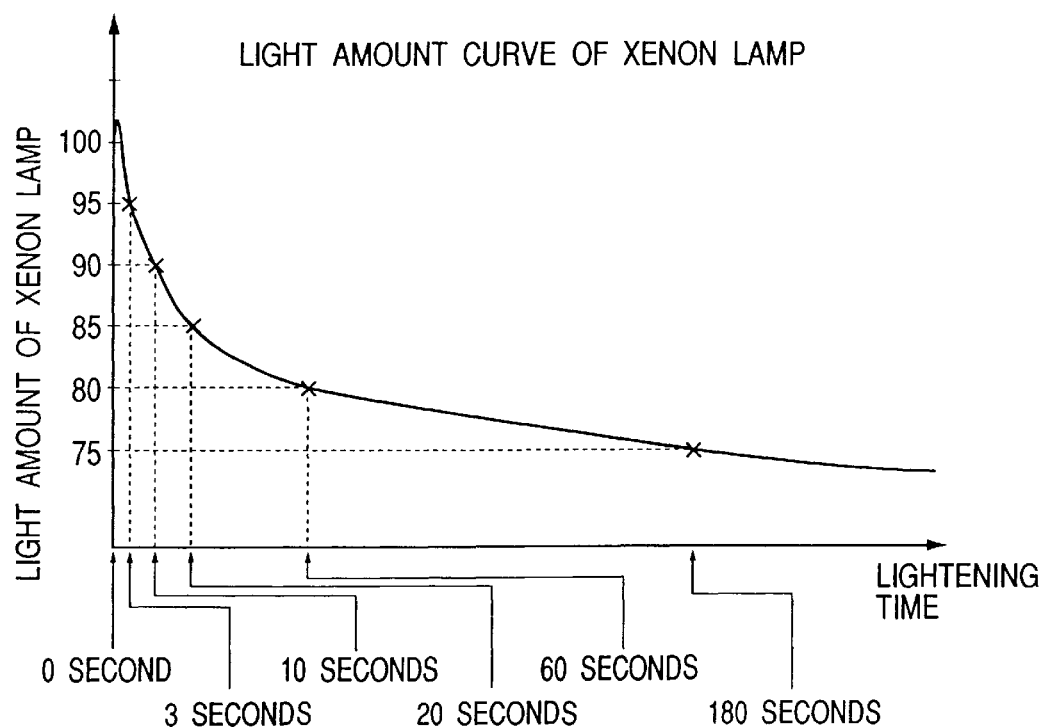
FIG. 3 is a diagram showing a change in a light amount of a light source (Xenon lamp) over a time of the image reading apparatus (facsimile apparatus) according to the invention.

FIG. 3 shows a change in light amount of the light source (Xenon lamp) 45 over a time used in the embodiment. As shown in FIG. 3, the light amount of the light source 45 slightly increases just after the light-on, suddenly decreases after that, subsequently slowly decreases, and finally shows an almost constant value.

Therefore, if the change in light amount of the light source 45 is preliminarily measured, by counting an elapsed time from the start of the light-on after that, the change in light amount of the light source 45 can be presumed.

By previously examining the relation between the change in light amount of the light source 45 and an influence on the image (image fog, light image, etc.), a time and a change amount in the light amount of the light source 45 in a range where there is no influence on the image can be presumed. The influence on the image differs depending on various conditions (for example, various image processes: an edge emphasis mode, a high gradation mode, etc.).

A lamp showing the change in light amount as shown in FIG. 3 is used. For example, in the case where a fluctuation of the light amount is equal to or larger than 5% so that a density of the read image changes, even if the white reference data is not rewritten each time one original is read, it is sufficient to perform the shading operation only at the timing simultaneous with the light-on and at the timings after 3 seconds, 10 seconds, 20 seconds, 60 seconds, and 180 seconds as shown in Table 1.

TABLE 1

| SHADING OPERATION TIMING | | | | | |
|---|---|---|---|---|---|
| 1st time | 2nd time | 3rd time | 4th time | 5th time | 6th time |
| 0 sec | 3 sec | 10 sec | 20 sec | 60 sec | 180 sec |

In this Example, the time from the light-on of the lamp when a number of originals are conveyed from the ADF (not shown) is measured. The shading operation is performed in the scanner 24 before or after the designated timings (times) mentioned above and when the image reading operation is not performed. It will be obviously understood that if a priority is given to the image reading precision, the shading operation can be also performed each time the image of one original is read. However, since the time for the shading operation is accumulated each time, the total image reading time eventually increases.

In this Example, the increase in total reading time can be minimized by performing the necessary and enough shading compensation.

EXAMPLE 2

In this Example, the light amount of the light source 45 in the Example 1 is monitored by the light amount sensor (not shown) and the shading operation is performed when a change in light amount previously instructed from the light amount at the time of the previous shading operation is detected.

EXAMPLE 3

In this Example, the change in light amount of the light source 45 in the Example 1 is calculated on the basis of the number of read images instead of the time and the shading operation is executed when the specific number of read images elapses.

EXAMPLE 4

In this Example, the change in light amount of the light source 45 in the Example 1 is calculated on the basis of the length in an original feed direction when the image is read instead of the time. In case of reading a number of originals each of which is long in the original feed direction, the number of times of shading operation relative to the number of originals is increased. That is to say, the number of originals using one white reference data is reduced.

Shading operation timings in case of combining Examples 3 and 4 are shown in Table 2.

TABLE 2

| Shading operation timings in the cases of A4 landscape, 30 sheets/min (2 seconds per sheet), and A3 portrait, 15 sheets/min (4 seconds per sheet) | | | | | |
|---|---|---|---|---|---|
| 1st time | 2nd time | 3rd time | 4th time | 5th time | 6th time |
| A4 landscape | 1st sheet | 3rd sheet | 5th sheet | 10th sheet | 30th sheet | 90th sheet |
| A3 portrait | 1st sheet | 2nd sheet | 3rd sheet | 5th sheet | 15th sheet | 45th sheet |

Table 2 shows that the timings (the number of sheets) to perform the shading operation are different depending on the A4 (landscape) size and A3 (portrait) size of the originals. This is because the number of originals which can be read per unit time differs depending on the original size. It will be understood that the number of originals to be read for a period of time from a rewriting to a rewriting of the reference data gradually increases at any size.

In the above case, for example, in case of the A4 landscape original, the original reading time of the first to fifth sheets and the original reading time (total image reading operating time) of the 51st to 55th sheets are different.

EXAMPLE 5

In this Example, when the change in light amount at the center of the light source 45 in the Example 1 and that in the end in the longitudinal direction of the light source 45 are different, the timing to perform the shading operation is changed between a case of the original of a small size in which only the center of the light source 45 is used and a case of the original of a large size in which an end of the light source 45 is also used.

Figure 4:
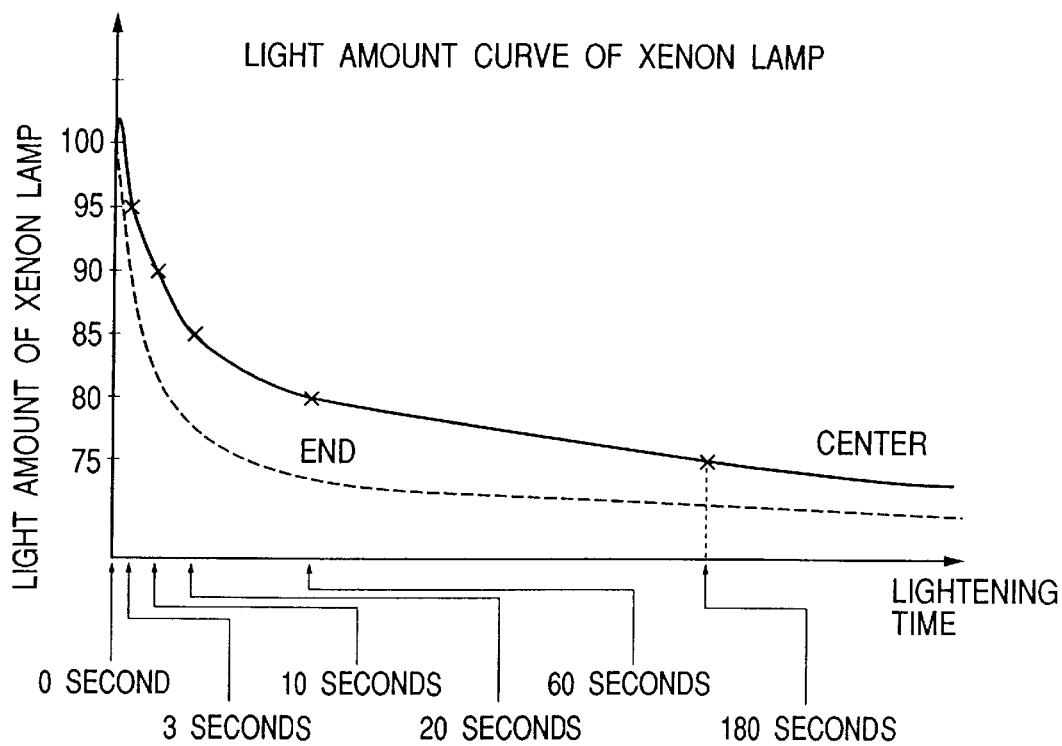
FIG. 4 is a diagram showing changes in light amounts at a center and an end of the light source (Xenon lamp) over a time of the image reading apparatus (facsimile apparatus) according to the invention.

FIG. 4 shows changes in light amount over a time of the Xenon lamp which is used in the embodiment.

As shown in FIG. 4, since the elapsed time from the light-on of the lamp and the change in light amount with respect to the center (solid line) and those with respect to the end (broken line) are largely different, in case of the original of a small size in which only the center portion of the light source is used, for example, it is sufficient to perform the shading operation at only the timing similar to that in the Example 1. However, in case of the original of a large size in which the end of the light source is also used, it is necessary to perform the shading operation every original.

EXAMPLE 6

In this Example, the timing to perform the shading operation is changed in accordance with the conveyance of the original.

That is, the lightening time of the light source 45 in case of using the ADF (not shown) and that in the case where an original is fixed on an original glass stand (not shown) and the scanner 24 is moved are different. It is necessary to individually perform necessary and sufficient shading operations.

EXAMPLE 7

In this Example, the timing to perform the shading operation is changed in accordance with the favor of the user.

Either one of a speed priority mode as shown in the Examples 1 to 4 and an image quality priority mode in which the white reference is rewritten every time is selected on the basis of the data inputted from the operation panel 30, a personal computer, or the like. That is, the user can select either the speed priority mode (second image reading mode) or the image quality priority mode (first image reading mode).

EXAMPLE 8

In this Example, the timing to perform the shading operation is changed in accordance with the kind of image processing means.

Figure 5:
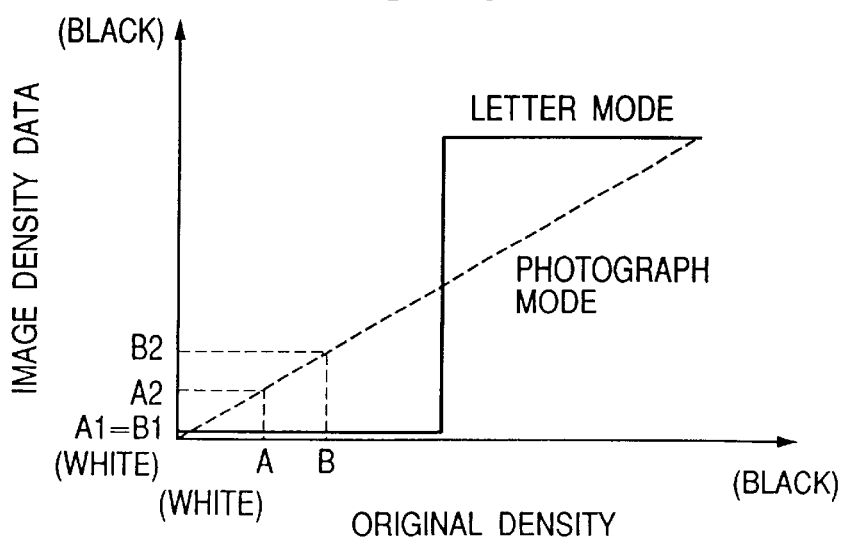
FIG. 5 is a diagram showing the relation between an original density and image density data after completion of an image process in the image reading apparatus (facsimile apparatus) according to the invention.
Figure 6:
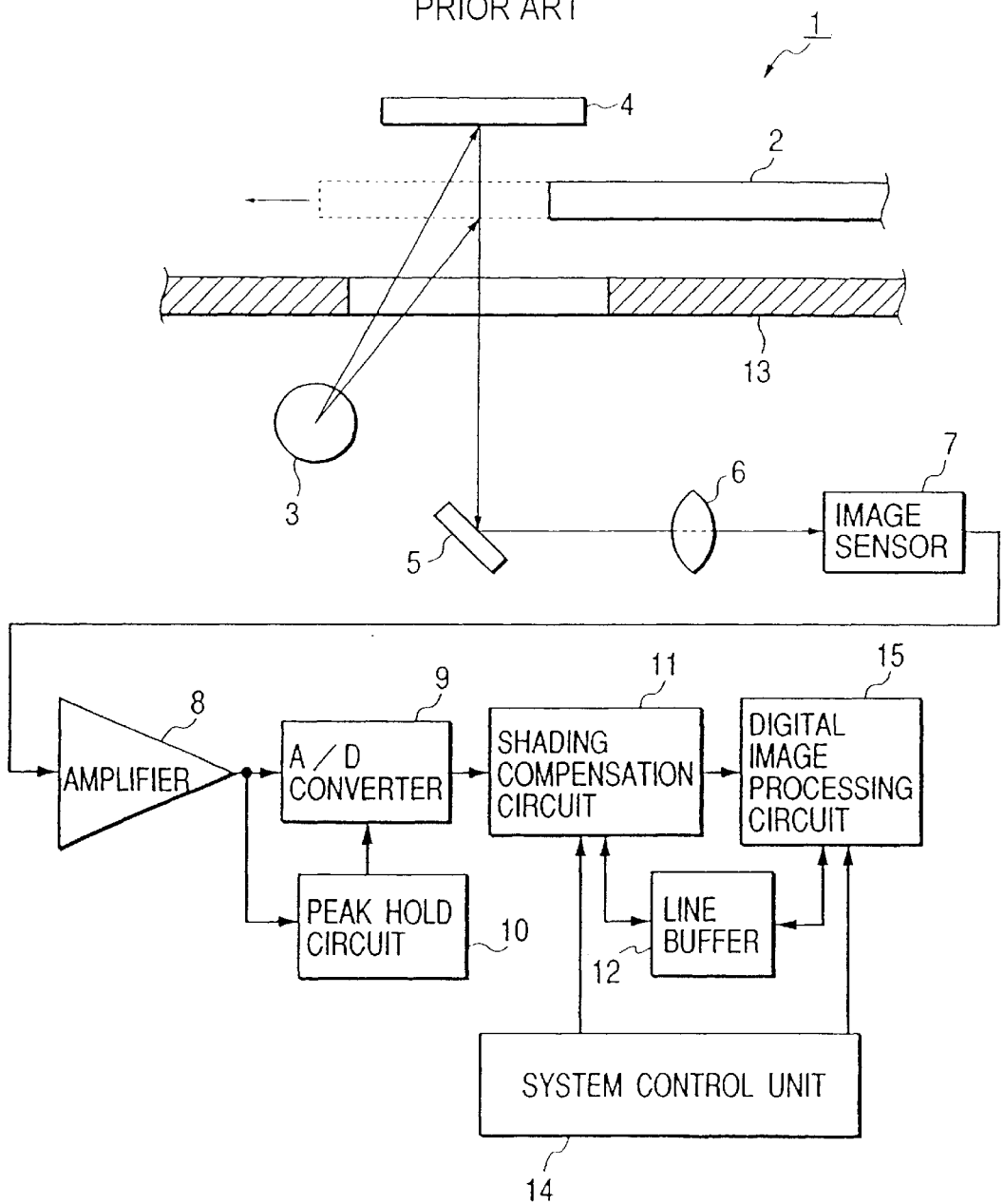
FIG. 6 is a constructional diagram of a main portion of a scanner of a conventional image reading apparatus (facsimile apparatus).

FIG. 5 shows the relation between the original density and the image density data after the image process. As shown in FIG. 5, the image density data after the image process and the original density are largely different from each other between a case of a letter (binary) mode in which an edge is generally emphasized and a case of a photograph mode in which a high gradation is required.

In case of the letter mode shown by a solid line in FIG. 5, even if the original density is slightly deviated, the image density data after the image process is not so influenced. However, in case of the photograph mode shown by a broken line, the image density data is influenced by the deviation of the original density and is fairly changed. For example, even if the original density in FIG. 5 changes from A to B in accordance with the change in light amount of the light source 45, although there is hardly a change between A1 and B1 in the letter mode, the data is largely changed from A2 to B2 in the photograph mode. This actually means that if the shading operation is not frequently performed in the photograph mode, the read image data is shifted to the dense side or an image fog occurs.

Therefore, since the shading operation is unnecessary every original in the letter mode (second image reading mode), for example, the shading operation is performed at the timing as shown in Table 1, the shading operating time is reduced, and the original reading time is reduced. In the photograph mode (first image reading mode), the shading operation is performed every original and the deterioration of the quality of the image can be prevented.

Although the present invention has been described above with respect to the example in which the invention is applied to, particularly, the facsimile apparatus, the invention is not limited to the application to the facsimile apparatus. For example, the invention can be also applied to a digital copying machine, a scanner which does not solely have any printing means, or the like.

The present invention is not limited to the foregoing embodiments but many modifications and variations are possible within the spirit and scope of the appended claims of the invention.

What is claimed is:

1. An image reading apparatus comprising:

a light source for illuminating an original;

a white member which is illuminated by light emitted from said light source;

a photoelectric converting element for receiving reflection light from the original and from said white member, and for providing an output image signal;

shading compensating means for compensating the output image signal on the basis of light received by said photoelectric converting element from said white member; and;

control means for controlling a timing during which said photoelectric converting element reads said white member, said timing being based on an elapsed time from a start of illumination of said light source and on a size of the original in a longitudinal direction of the light source, wherein the shorter the elapsed time from the start of illumination of said light source, the greater a frequency of reading said white member, and the larger the size of the original in the longitudinal direction of said light source, the greater the frequency of reading said white member.

2. An image reading apparatus according to claim 1, wherein said light source is a Xenon lamp.

3. An image reading apparatus according to claim 1, wherein the light amount of said light source increases after the start of light-on of said light source, thereafter decreases, and becomes substantially constant.

* * * * *